Jan. 16, 1962    R. R. CHATLAIN    3,016,812
MOTION ANALYZER
Filed Feb. 3, 1955    5 Sheets-Sheet 1

INVENTOR.
ROBERT R. CHATLAIN
BY
Philip H. Sheridan
ATTORNEY

Jan. 16, 1962  R. R. CHATLAIN  3,016,812
MOTION ANALYZER
Filed Feb. 3, 1955  5 Sheets-Sheet 2

INVENTOR.
ROBERT R. CHATLAIN
BY
Philip H. Sheridan
ATTORNEY

INVENTOR.
ROBERT R. CHATLAIN
ATTORNEY

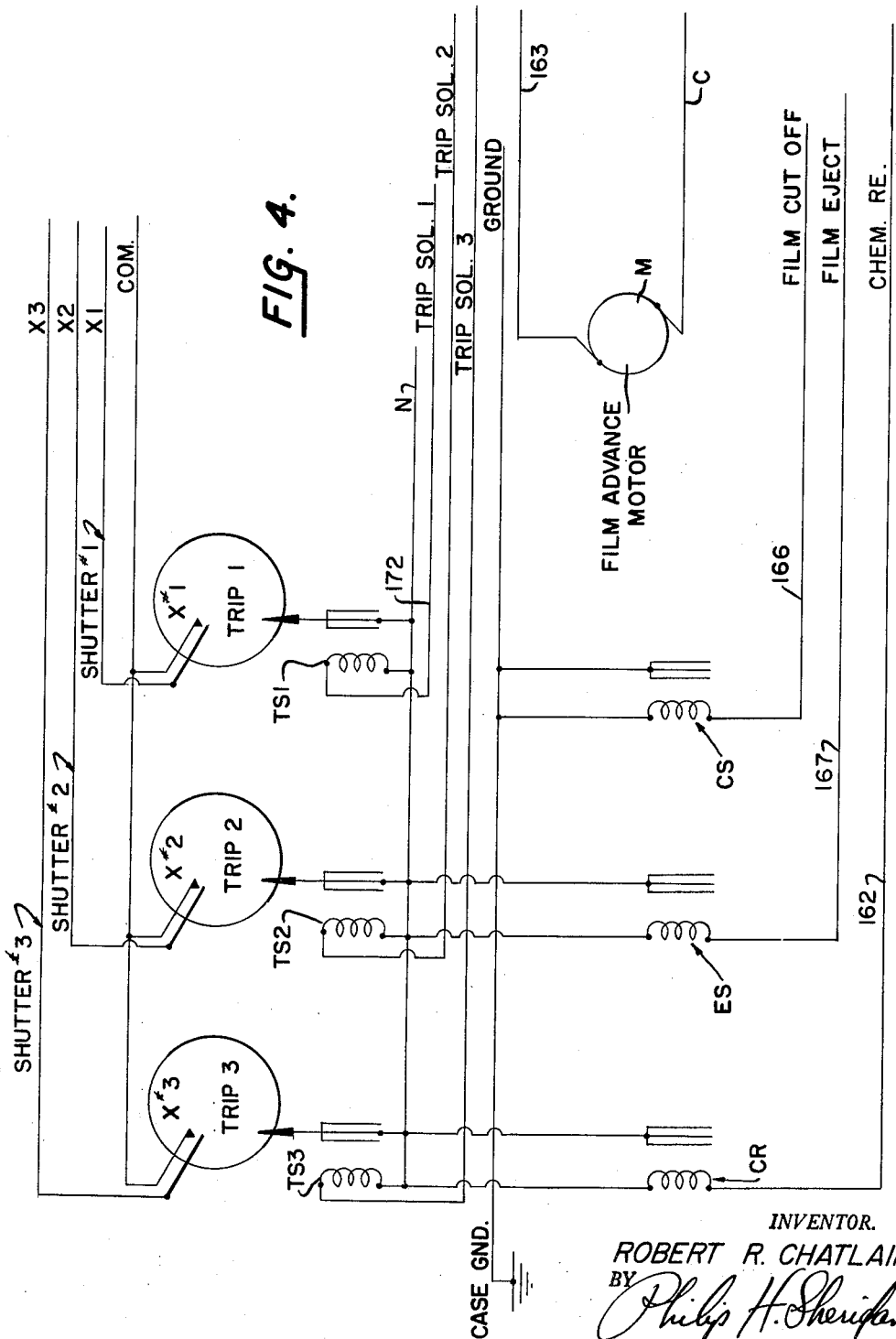

INVENTOR.
ROBERT R. CHATLAIN
BY Philip H. Sheridan
ATTORNEY

United States Patent Office 3,016,812
Patented Jan. 16, 1962

3,016,812
MOTION ANALYZER
Robert R. Chatlain, 140 Eudora St., Denver, Colo., assignor of fifty percent to Jay E. Sullivan, Denver, Colo.
Filed Feb. 3, 1955, Ser. No. 485,956
22 Claims. (Cl. 95—11)

This invention relates generally to apparatus for analyzing the motion of a moving part or person whereby a record and study may be made of such motion or movement and particularly to determining and analyzing the motion of a bowler or other sportsman which requires skilled body movements for successful results.

There are available prior art devices for photographing the finish of horse races and the like or for taking pictures of horses at various intervals around the track. Also, it is known to provide camera control systems for the sequential operation of a camera or cameras and to provide apparatus for photographing the flight of a body through space. Further, there have been developed apparatuses broadly directed to and used for the study and correction of motions, such as that disclosed in the U.S. patent to F. B. Gilbreth, No. 1,199,980. However, to the best of my knowledge, there is not known or available a modern type of apparatus, as provided by the present invention, for analyzing motions of sportsmen or moving parts where a plurality of correct or sequential movements are critical for successful operation and for providing quickly and efficiently an accurate recording for study and analysis of the plurality of movements.

With the above in mind, it is an object of this invention to provide an improved apparatus for analyzing and recording a plurality of movements of a person or part so that a study may be made of such movements.

Another object of the invention is to provide an apparatus of the type described which may be readily installed for operational control by a coin operated mechanism.

A further object of the invention is to provide a motion analyzer including at least two light beams arranged to be interrupted by the path of motion being analyzed, associating light sensitive means and flash equipment with each light beam, arranging a camera shutter to be actuated and expose film upon each operation of the flash equipment, the latter in turn being controlled by the light sensitive means and circuit elements associated with each.

Yet another object of the invention is to provide apparatus of the type described in the preceding paragraph including timer means associated with a coin controlled switch whereby one of the light beams must be interrupted by the path of motion within a predetermined period following depositing of a coin.

A still further object of this invention is to provide apparatus described in the penultimate paragraph including timer means insuring that the recording process comprising film advance and development means will be actuated within a predetermined period of time following interruption of one of the light beams by the motion being analyzed.

It is an object of the invention to provide apparatus of the type described in the three preceding paragraphs including automatic means for insuring that during each complete cycle all of the light beams should be interrupted during a predetermined period of time as only those that are interrupted are of consequence during the particular cycle; and also automatic means whereby a second interruption of any one light beam during the particular cycle will be of no consequence.

Yet a further object of the invention is to provide a motion analyzer of the type described including a camera and automatic mechanism associated therewith for developing and releasing during each cycle the exposed film within a brief interval of time following completion of the movement or motion being analyzed.

Finally, it is an object of the invention to provide a motion analyzer of the type described which may be readily installed adjacent the intended path of motion, which provides automatically and speedily a record for examination and study of the motion and which is composed of a relatively few and compact parts, thereby avoiding bulkiness.

Other objects and advantages of the invention will become apparent upon considering the following detailed description in conjunction with the drawings wherein like numerals represent similar elements throughout:

FIGURE 4 is a wiring diagram of the electrical components used to operate the camera employed in the invention;

Hereinafter, for the sake of clarification and simplicity, the present invention will be described with reference to analyzing a bowler's form and appearance during bowling. However, it is to be understood that the invention has many other applications, such as analyzing the form of a golfer or persons engaged in other sport activities, determining the motion of dancers, analyzing machine operations in factories, making time and motion studies, and generally analyzing any type of movement of a part or person where it is desired to study and/or improve such movement.

Broadly, the motion analyzer consists in providing a plurality of light beams arranged to be interrupted by the path of the motion being analyzed, associating with each light beam a photosensitive means and electronic repeating flash equipment, arranging a camera shutter to be actuated and expose the film upon operation of the light source of each flash equipment, the latter in turn being controlled by the photosensitive means and circuit elements connected with each, providing timer means whereby the light beams must be interrupted within a predetermined time period following which the film of the camera is automatically developed and made available for study within a second predetermined time period. Of course, additional and numerous controls are employed with the analyzer and these will be explained in detail hereinafter.

Figure 1:
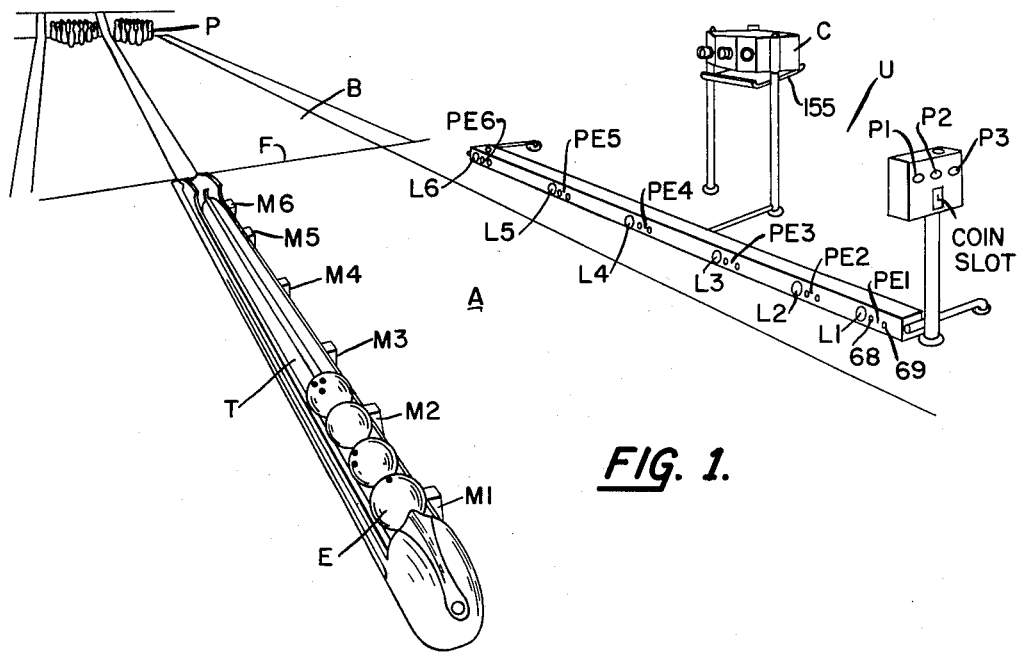
FIGURE 1 is a diagrammatic view illustrative of an application of the invention.
Figure 2:
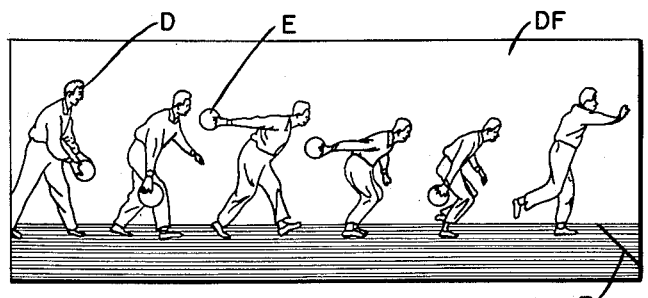
FIGURE 2 is a view illustrating typical pictures taken by the use of this invention.

In FIGURE 1, numeral U represents the complete motion analyzer unit, while a bowling alley is shown at B, said alley including the usual track T for bowling balls E, pins P and area A in front of the foul line F. As known, the usual bowler D, shown in FIGURE 2, stands at the commencement of area A and takes about four steps or strides prior to discharge of a bowling ball E onto the alley B and, of course, the bowler must take precaution to assure that he does not travel beyond line F and thereby commit a foul. The present invention may be used to analyze the motion of the bowler D while traveling over area A and the picture shown in FIGURE 2 is representative of the analyzing provided by this invention. It can be seen that the developed film DF contains six pictures of the bowler, each picture being indicative of the bowler's appearance during a portion of his travel. It is apparent that a fewer or greater number of pictures of the bowler may be taken and superimposed on the film and the disclosure hereinafter described in detail is merely illustrative of six pictures and not to be limited thereby.

Figure 3:
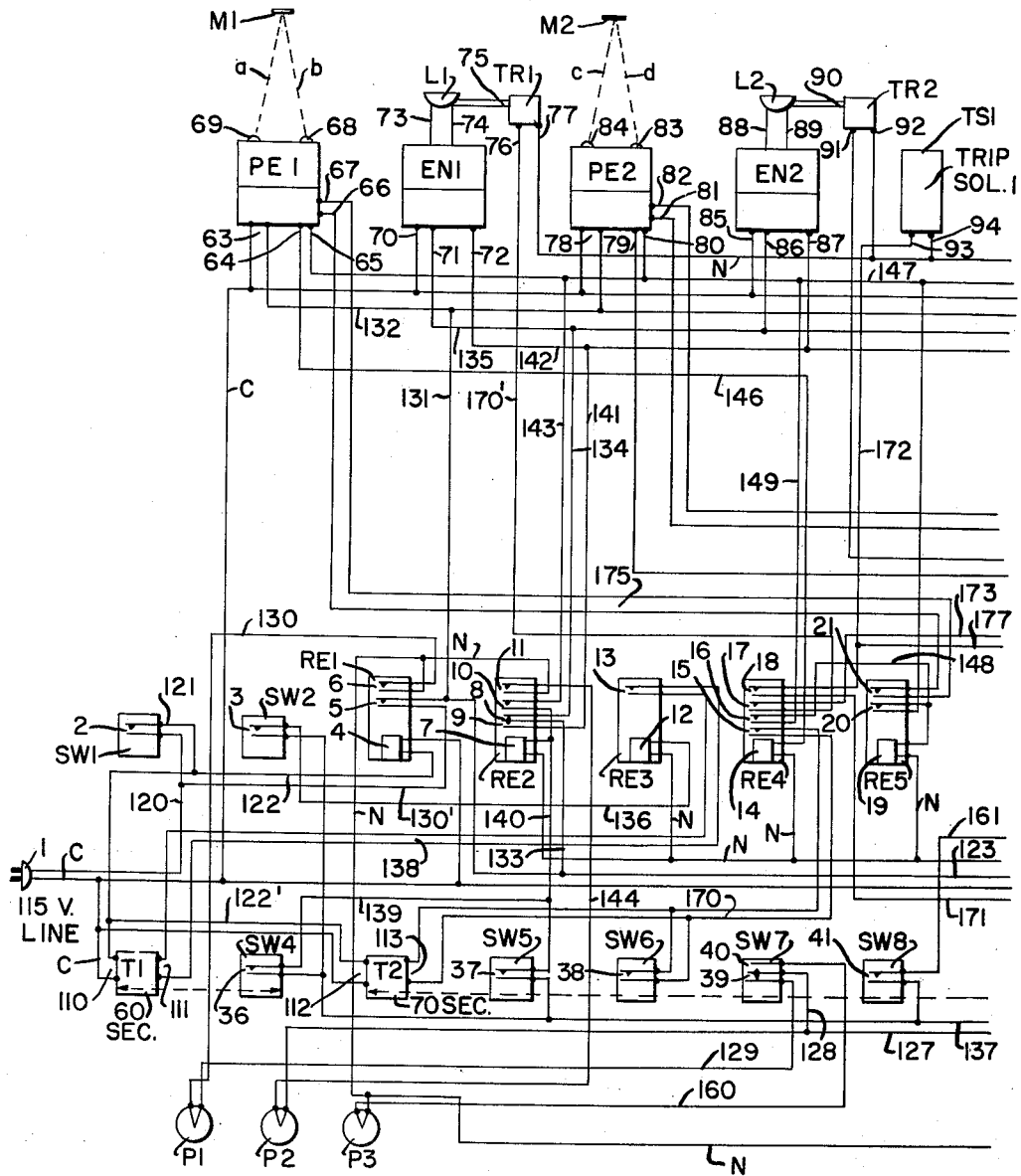
FIGURES 3 and 3a are wiring diagrams illustrative of the main principles of the invention.
Figure 3A:
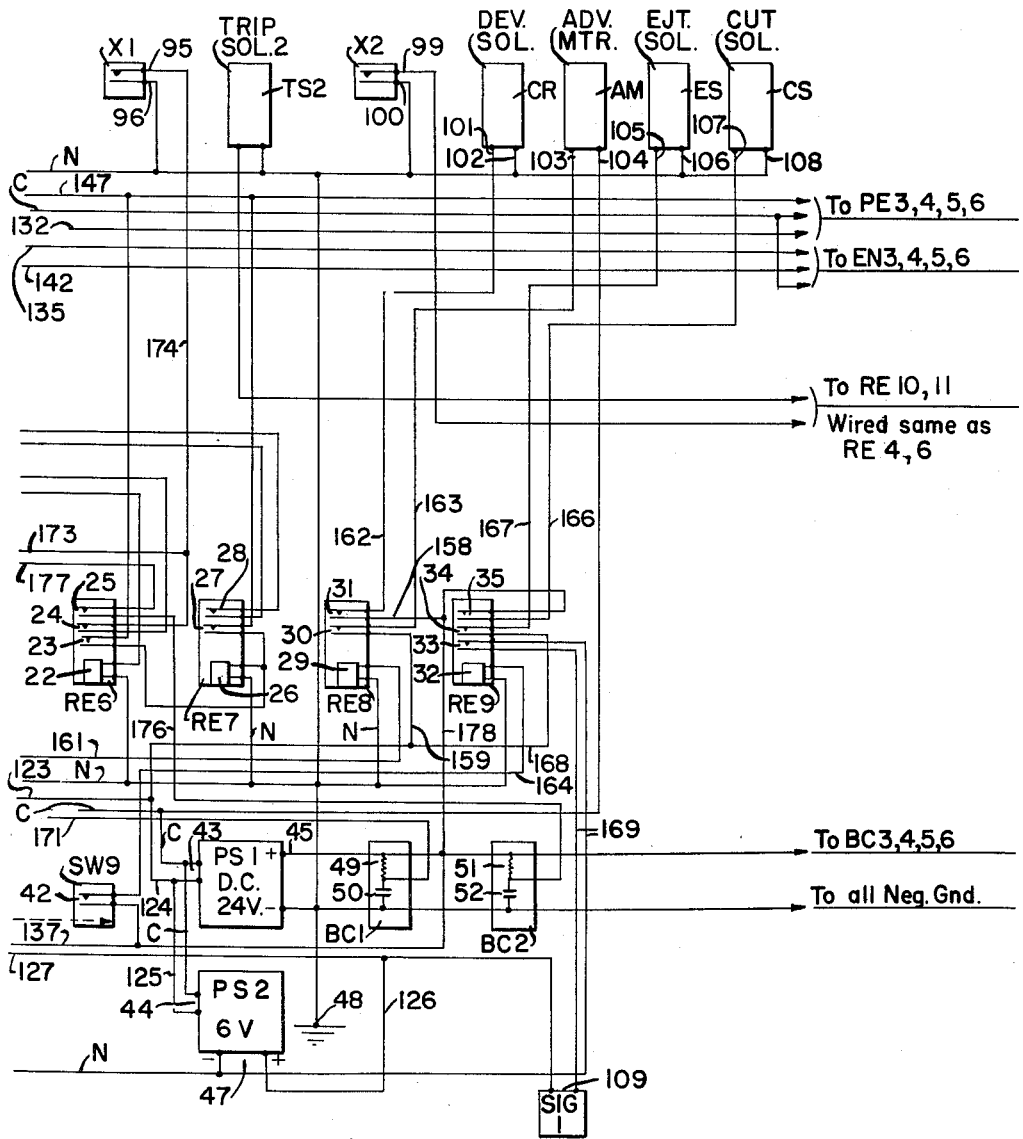

The principal elements of the invention shown in FIGURE 1 include the camera C supported by a suitable stand, a plurality of photoelectric units PE1–6, flash tubes L1 to L6, light reflecting mirrors M1–6, and the parts thereof are commercially available and standard with the possible exception of some of the camera structure. However, only an exemplary number of units PE1–6, lamps L1 to L6 and mirrors M1–6 are illustrated in the wiring diagram of FIGURES 3 and 3a for the reason that a mere duplication is not deemed necessary for a clear understanding. The arrangement illustrated in FIGURE 1 is merely provided to pictorially show a possible positioning of parts in connection with a bowling alley, but it is understood that the positioning will have to be modified in accordance with the teachings of FIGURES 3 to 7, inclusive, by those skilled in the art. For example, each shutter and lens barrel of the camera C will have to be positioned to best advantage with respect to the light beams, flash equipment and photoelectric means associated therewith. In other words, as will be apparent hereinafter, one shutter and lens unit is intended to cover a certain field of motion being analyzed and the associated equipment for such shutter must be placed at the most propitious position, but those familiar with the photography art would be clearly capable of doing this upon learning of the important principles of this invention which are hereinafter described.

For a brief description of the principal elements, reference is made to FIGURES 3 to 7, inclusive, wherein 1 is a plug adapted to connect the circuit with 115 volts A.C. A conventional key operated switch SW1 and a conventional coin operated switch SW2 are provided, respectively, with contacts 2 and 3. RE1 is a standard A.C. operated relay and RE2 to RE9 inclusive, are standard D.C. operated relays, each containing, respectively, relay coils 4, 7, 12, 14, 19, 22, 26, 29 and 32. The contacts of each relay vary, depending upon what the situation dictates, unit RE1 being provided with contacts 5 and 6, RE2 with contacts 8, 9, 10 and 11, RE3 with contacts 13, RE4 with contacts 15, 16, 17 and 18, RE5 with contacts 20 and 21, RE6 with contacts 23, 24 and 25, RE7 with contacts 27 and 28, RE8 with contacts 30 and 31, and RE9 with contacts 33, 34 and 35. PS1 is illustrated as a 24 volt D.C. power supply operated from 115 volts A.C. in the conventional manner, and it is somewhat essential that the majority of relays operate from a D.C. source, due to the relatively short time intervals that are required. BC1 and BC2 are battery-condenser units with condensers 50 and 52, respectively, being charged in series with resistors 49 and 51, respectively. Of course, there would be six BC units, namely, BC1 to BC6, but for simplicity only BC1 and BC2 are illustrated. Indicator lamps are shown at P1 (red), P2 (green) and P3 (amber) and an audible signal unit is represented by Sig. 1, the lamps P1, P2 and P3 and signal Sig. 1 preferably being operated from a simple 6 volt A.C. power supply PS2. It might be mentioned that PS1 and PS2, respectively, may include transformers and other standard elements to convert 115 A.C. to 24 volts D.C. and 6 volts A.C., respectively, and these voltages are merely selected and not limiting.

A conventional 60 second timer T1 operates a cam, not shown, which controls the closing and opening of contacts 36 of cam operated switch SW4. T2 represents a 70 second timer having associated therewith on a common shaft a plurality of cams, not shown, for controlling the operation of contacts 37, 38, 39, 40, 41 and 42 of switches SW5 to SW9, inclusive. It is not deemed necessary to illustrate the details of timers T1 and T2 and the respective cams controlled thereby as such type of devices are very well known to those skilled in the art and are merely representative of timer units that have been in use for many years, the only possible difference being in the particular sequence of operation of the switches by the cams.

Figure 6:
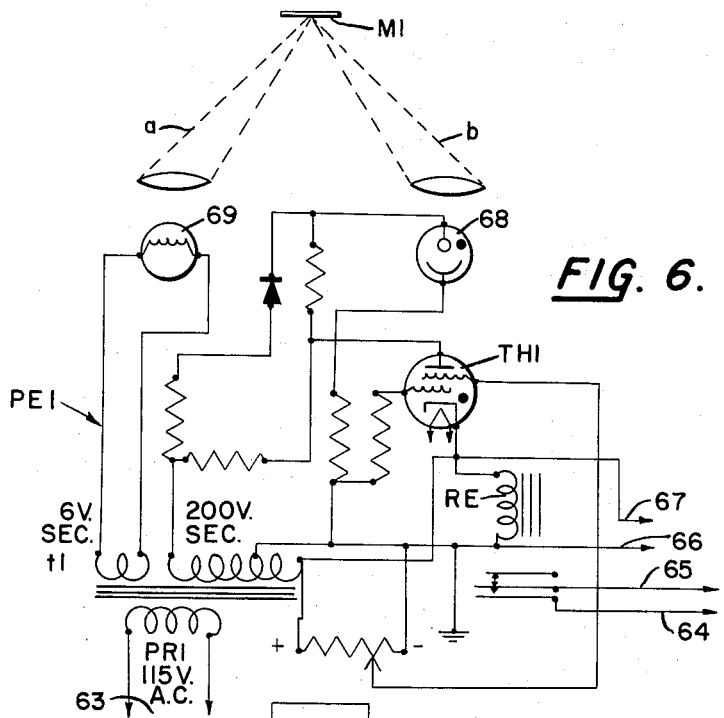
FIGURE 6 is a detailed electrical view of one of the photoelectric units employed.
Figure 7:
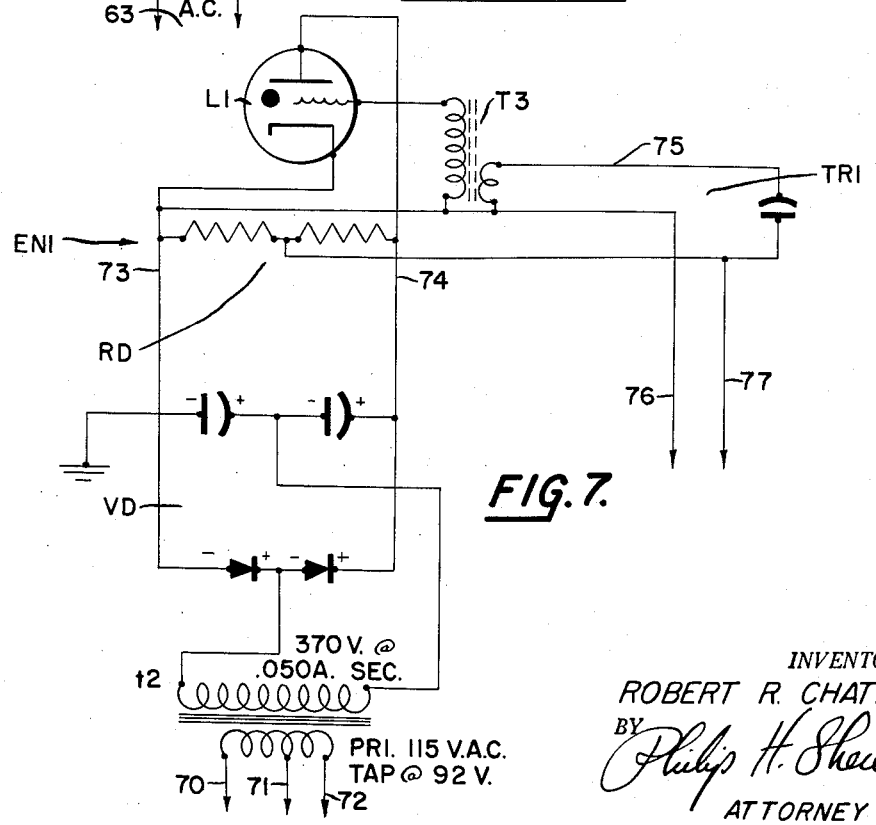
FIGURE 7 is a detailed electrical view of one of the flash units employed.

PE1 is a photoelectric unit complete with a light source and a photosensitive cell, while EN1 is an electronic repeating flash equipment unit. In using the invention in connection with bowling, there are preferably six identical photoelectric units, namely, PE1 to PE6 and six identical units EN1 to EN6, only PE1, PE2, EN1 and EN2 and their associated circuit elements being illustrated in FIGURES 3 and 3a. Altough units PE and EN are standard and well known and may be varied considerably by those skilled in the art, FIGURES 6 and 7 illustrate typical such units that may be employed. As shown, PE1 includes essentially light source 69, photoelectric cell 68, a thyratron tube TH1 and a relay RE, while EN1 includes essentially a voltage doubler circuit VD, a voltage divider means RD, a trigger circuit TR1 and a flash tube L1.

Figure 5:
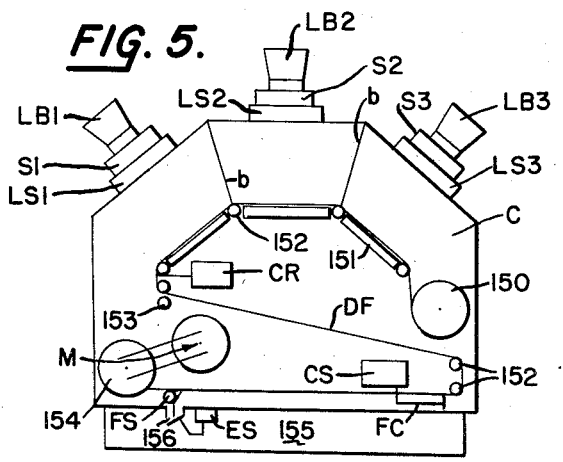
FIGURE 5 is a schematic view of the camera used with the invention.

The camera shown in FIGURE 5 includes a main body C, three lens boards LS1, LS2 and LS3, three shutters S1, S2 and S3, and three lens barrels LB1, LB2 and LB3. Barrier plates between each lens-shutter combination are shown at b. The film DF, preferably of the one minute type which develops a finished picture in approximately one minute after exposure such as Polaroid film, is stored on reel 150 and is arranged to be advanced over guide beds 151 and guide rollers 152, numeral 153 representing a suitable pressure roller.

Referring to FIGURES 3, 3a, 4 and 5, there are shown shutter contacts X1, X2 and X3, trip solenoids TS1, 2 and 3, a film advance motor M operated by an advance motor solenoid AM, a chemical release solenoid CR for puncturing the developing material contained in film DF, a film ejector solenoid ES and a film cut-off solenoid CS. All of these parts are standard and commercially available and the camera C is arranged to take six pictures by actuation of each shutter twice. As is known, the film DF consists of a double layer of paper and cardboard and a film splitter FS of any suitable type and film cutter FC are provided whereby the paper may be wound on the winding spool 154 and the cardboard containing the developed picture ejected onto the tray 155. Actually, the camera C is similar to the well known Polaroid Land camera, which is a one minute picture camera, except that the operation of camera C is mechanized. In connection with ejecting, splitting and cutting, the film is preferably split by the actuation of solenoid FS (this not being shown in the wiring diagrams of FIGURES 3 and 4 since it is well known) after it leaves roll 153. The cutter solenoid CS is actuated to cut the cardboard after the six developed pictures have passed thereby and simultaneously ejecting solenoid ES is actuatted to open door 156 whereupon the cardboard is guided, by any suitable means, to fall onto tray 155. Only operation of shutter S1 will be hereinafter described in detail and this shutter is actuated when light reflected from or directed to M1 and M2 is interrupted. In other words, the portion of film DF associated with S1 is exposed upon each actuation of S1, but among other factors the angle of instantaneous illumination from L1 and L2 is such that, during the first tripping of S1, one-half of the portion of the film is exposed in reality to the illumination or flash, the other half being exposed only to the ambient light in the room and during the second tripping of S1 the second half is exposed to other than ambient light. In other words, as will be hereinafter pointed out, when TS1 fully opens shutter S1 for the first time, contacts X1 close to fire L1 and the first half of the film DF beneath the shutter S1 is exposed to the flash, while the second half receives some light from the flash or strobe lamp but not enough to destroy the sensitivity of the second half. Actually, the invention is concerned with high speed multiflash with a duration of about one-half a millisecond and therefore the second half will stand repeated exposure of the type described, due to the short duration of light. Vice versa, exposure occurs during ionization or firing of L2 in connection with the second half of film DF which is associated with shutter S1. It should also be mentioned that X1, X2 and X3 are known as class X contacts (0 delay).

A complete understanding of the invention may be best had by describing a typical operation sequence or cycle. The operator of the bowling alley places the unit U in condition for operation by connecting plug 1 to the 115 volt A.C. supply and manually turning on the key switch SW1 to close contacts 2. Referring to FIGURES 3, 3a, 4, 6 and 7, such results in A.C. current being applied through line 120, closed contacts 2, lines 121 and 122 to energize coil 4 of A.C. operated relay RE1 and thus close contacts 5 and 6. The other side of the relay provides a current path through the A.C. common wires C. A.C. voltage is also applied through lines 122 and c to terminals 110 of timer T1 and lines 122' and c to terminals 112 of timer T2; from contacts 5, lines 130', 123, 124 and c to terminals 43 of PS1 and through lines 125 and c to terminals 44 of PS2. Red lamp P1 becomes energized by the supply thereto of 6 volts from PS2 through lines 126, 127 and 128, normally closed contacts 39 or SW7, lines 129, 130, closed contacts 6 and negative line n. The closing of contacts 5 also supplies A.C. voltage through lines 131, 130', 132 and c to terminals 63 of PE1, through lines 131, 132 to terminals 78 of PE2 and from contacts 5 through lines 123 and 133, normally closed contacts 8 of RE2, line 134, lines 135 and c to terminals 70 and 71 of EN1 and 85 and 86 of EN2. Units EN3 to EN6 and PE3 to PE6, not shown, would be similarly energized.

Now, referring to FIGURE 6, the energization of the primary transformer t1 by application of 115 volts to terminals 63 results in light source 69 being operated to create beam a and reflected beam b from M1, the latter beam causing photocell 68 to supply current to the grid of thyratron TH1, causing the latter to fire or ionize and insuring that the relay RE is in its normally closed position whereby terminals 64 and 65 are not connected in circuit. PE1 to PE6 all operate in the same manner and at the same time. As to units EN1 to EN6, the energization of each is identical and referring to FIGURE 7, current through terminals 70 and 71 of EN1 functions to supply a reduced voltage, due to the tap on transformer 72, charge on the energy storage capacitors of the voltage doubler VD and the condenser of the triggering unit TR1, the gas filled tube L1 only operating upon triggering the coil T3 of trigger unit TR1. Again, it is stated that EN1 to EN6 are conventional A.C. operated electronic flash units, and the detailed circuits thereof are very familiar to one skilled in the art and could be modified.

Now, a bowler D arranges to have deposited a coin, for example a fifty cent piece or a quarter, in the slot for coin switch SW2 and immediately thereafter positions himself at the beginning of area A prepared for bowling action. Such results in the closing of contacts 3 of SW2, and D.C. operational current being supplied through lines 136, 137 and the negative lines to coil 12 of RE3 from the positive and negative terminals 45 and 46 of PS1, coil 12 being connected in series with contacts 3. Contacts 13 now close and complete the circuit through leads 138 for 115 volts to be applied to timer T1 through terminals 111. The operation of the 60 second timer, and this time period is arbitrary and not limiting, drives its cam, not shown, to close contacts 36 of SW4 and such causes D.C. operating current to be supplied, through leads 137, 139 and 140 to coil 7 of relay RE2. This results in the opening of contacts 8 and the closing of contacts 9 to supply 115 volts to the high voltage terminals 70 and 72 of EN1 and 85 and 87 of EN2, through lines 133, 141, 142 and the c lines. Through contacts 10 and lines 143 and 147, D.C. operating current is supplied to terminal 65 of PE1, terminal 80 of PE2 and similarly to the remaining PE units. Of course, as previously explained, the thyratrons of each PE unit do not cease firing or de-ionize until the light beams a, b, c or d are interrupted and, therefore, terminals 65 and 80, respectively, are not connected in circuit with terminals 64 and 75, respectively. Through contacts 11, line 144 and the negative leads, 6 volts are supplied to green lamp P2 which indicates the unit U is in operation and that the bowler should commence his travel towards discharge of ball E. P1 remains energized until timer T2 is energized, but the circuit could be modified to de-energize P1 upon actuation of contacts 11 to energize the amber light P2.

The bowler D now proceeds to take his strides preparatory to discharge of the ball E in alley A, and during this travel will interrupt light beams a, b, c and d, and the remaining beams not illustrated. If the bowler does not break or interrupt beams a and/or b within the 60 second period of timer T1, then the contacts 36, through cam operation, open to interrupt the D.C. current applied to coil 7 of RE2 and this results in RE2 releasing and the entire circuit restoring to conditions which existed prior to operation of switch SW2. When this happens, the bowler D loses his opportunity to utilize the unit U without depositing an additional coin in SW2. It should be mentioned that in actuality, beams a and b are probably about two inches apart whereby the interrupting of beams a and b are for all practical purposes simultaneous.

Assuming the bowler D does break the beam a and/or b within the 60 second time period, it being understood that the 60 second period is only by way of example, then, referring to FIGURE 6, the photocell 68 of PE1 ceases momentarily to conduct. Such results in altering the bias being applied to thyratron TH1 whereby the latter ceases firing to release relay RE which permits D.C. current to flow from terminals 64 and 65 through line 146 to energize coil 14 of RE4. Contacts 15 now close and A.C. operational current is supplied through leads 170 to complete the timer T2 circuit. The timer T2 motor is now operated, as are the plurality of cams for operating switches SW5 to SW9. T2 is preferably a conventional motor operated 70 second timer, although here again the time period is merely selected and is not to be considered limiting. The cams, not shown, are mounted ot rotate on a common shaft and are associated with their respective switches SW5 to SW9 to operate the latter in a predetermined sequence. Such positioning of cams and switch contacts is well known to those skilled in the art, with the shape of each cam being designed for particular contact operation. It might simplify matters to state that it is assumed that 10 seconds after bowler D interrupts the first light beam a that he has completed his bowling run. This means that all of the six pictures are to be taken within this 10 second period, the remaining 60 seconds being for film development. The switches SW7, 8 and 9 are associated with film development circuits, the cams for each of the latter switches being designed so that their contacts operate after the 10 second period.

The cam means for SW5 and SW6 operates immediately upon energization of T2 to close contacts 37 and 38. SW6 functions as a holding switch for maintaining the operation of timer T2 and the contacts 37, upon closing, in effect short out timer T1, which means that operational current is not interrupted in RE2 upon the opening of contacts 36 of SW1 whereby the bowler D may complete his run even though it be during 60 to 70 seconds following deposit of the coin.

Regressing to where the bowler D interrupts light beams a and/or b, it has been explained that timer T2 is energized and contacts 37 and 38 are simultaneously closed. Also, the simultaneous closing of contacts 16, 17 and 18 results in operational current being supplied, through lines 147, 148, 149 and n to coil 19 of RE5; the completion of the triggering circuit, through line 170', which is connected to terminal 76 of TR1; and the connection of BC1, through lines 171 and 172, to terminal 93 of TS1; and it is to be noted that trigger unit terminal 76 is connected, through lines 173 and 174 with terminal 95 of shutter contact X1. The action is substantially simultaneous with BC1 supplying stored energy to trip solenoid TS1 through terminal 93 and the latter action results in actuation of contacts X1 which trip or completely open the shutter S1 to expose the film DF beneath the first shutter lens unit. Supplying current to terminal 76 also, by referring to FIGURE 7, completes a circuit to the trigger coil t3 of TR1 which permits firing of L1 simultaneously with the tripping of S1 for the first time. The energy stored in EN1 is dissipated in the form of light in L. The light from the flash tube L1 is arranged to only expose thereto one-half of the portion of the film DF that is exposed upon tripping the shutter S1, the remaining one-half portion being, in effect, only exposed to ambient room light, this being in accordance with the foregoing description.

It should be mentioned that BC1 and BC2, as well as BC3 to BC6, are simple battery capacitor units for operating a small solenoid such as TS1, and it is well known that such units provide much faster operation than would a straight D.C. voltage source.

After picture 1 has been taken, RE4 drops out as photocell 68, due to the light beam b, again supplies current to cause the firing of thyratron TH1. However, timer T2 remains operative once it is energized, due to holding switch SW6. Also, the actuation of RE5 causes current to be supplied, through contacts 21 and leads 175, to terminals 66 and 67 of PE1 which functions to short circuit RE and prevent further actuation of RE during the cycle. In other words, in the event the bowler D moved backwards to again break beam a and/or b, RE4 would not be actuated or PE1 cannot again be operated during the cycle, relay RE5 being of the type that remains locked in energized position once it is actuated. Also, it should be appreciated that each shutter actuation is for five to ten milliseconds and during this period of time the flash tube L1 fires, whereby the first picture is taken.

Next the bowler D interrupts light beam c and/or d and the sequence just described is repeated through operation of the relay RE in PE2 and operation of relays RE6 and RE7. Trip solenoid TS1 is again operated, this time from the stored energy in BC2, through lines 176 and 177. Due to the relay operational sequence, the closing again of contacts X1 fires lamp L2 through trigger unit TR2 and the energy stored in EN2 is dissipated in L2 which completes the sequence of two pictures. It should be mentioned that upon the tripping of S1 the second time the second half of the portion of film F is exposed to the flash, the first half only in effect being exposed to ambient light.

Following completion of picture 2, RE6 drops out for the same reasons as in connection with RE4, RE7 being locked in energized position. The complete sequence of operations is repeated by interrupting the light beams associated with units PE3 to PE6. Trip solenoid TS2 would be associated with contacts X2 of shutter NO2 and the trip solenoid TS3 with contacts X3 of shutter NO3 in the manner shown in FIGURE 4. The illustrated camera C, as mentioned, has three lenses and shutters and each shutter and lens combination takes two pictures, making a sequence of six pictures in all.

Ten seconds after bowler D interrupts the first light beam a, it is assumed that he has completed his bowling run and the following operations occur. The cam means of T2 associated with SW5 now causes contacts 37 to open and thus, as is believed obvious from FIGURE 3, D.C. operational current is interrupted from coil 7, assuming T1 is de-energized, and thus relay RE2 drops out or becomes de-energized. Lamp P2 is de-energized due to opening of contacts 11. Simultaneously, the cam means associated with switches SW7 and SW8 cause contacts 40 and 41 to close and contacts 39 to open. The opening of contacts 39 de-energizes red lamp P1 and the closing of contacts 40 energizes through line 160 and the negative lines lamp P3. Lamp P3 is preferably an amber lamp to indicate that the picture sequence is complete and that the film developing process is about to start. The closing of contacts 41 of switch SW8 applies through lines 137 and 161 D.C. operating current to coil 29 of relay RE8. Actuation of relay RE8 closes contacts 31 and D.C. operating voltage is applied through lines 137, 158, 178 and 162 to terminal 101 of the developing solenoid CR, thereby completing a circuit resulting in actuation of CR. A.C. operational current is applied to advance motor AM upon the closing of contacts 30, the completed circuit being obvious and including lines 159, 163 and terminals 103 and 104.

As a result of the actuation of the advance motor AM and the developing solenoid CR, the developing solenoid pierces the chemical release cartridges associated with the film DF, and the advance motor advances the film one position at a time during which the developing solution is spread across the exposed negative, this all being in accordance with standard practice on films of the one minute development type. The cam means associated with switch SW8 functions to hold contacts 41 closed long enough to perform the development of the six pictures, the developing cycle being controlled, of course, by timer T2. Sixty seconds after operation of SW8, contacts 41 open and the cam means associated with the switch SW9 cause contacts 42 to close, and supply D.C. operating voltage through line 164 to coil 32 of relay RE9, energization of the latter resulting in the closing of contacts 33, 34 and 35. Contacts 35 supply D.C. operating voltage through lines 166 and 178 and terminals 107 and 108 to the film cut solenoid CS, the solenoid functioning in a manner previously described. The closing of contacts 34 applies through lines 167 and 168 and terminals 105 and 106, A.C. current to film ejecting solenoid ES, which also functions in the manner described above. It is to be understood that contacts 35 and 34 are of the follow type, well known in the art, whereby contacts 35 close ahead of contacts 34, although the delay is very slight and need be in the order of only ten milliseconds. By this time, the film has been developed and ejected and cut from the camera whereby it may be picked up from the tray 155, examined and kept by the bowler D so that he may study and try to improve on the motion analyzed by the unit U, a typical motion being illustrated in FIGURE 2.

It is to be noted that closing of contacts 33 apply operating voltage through lines 169, 127 and n to the signal unit Sig 1 and energization of the latter provides a short audible signal indicating that the picture is complete and the developed film may be picked up by the bowler, and further indicates that the unit U is in condition for a new operation as the circuits, due to de-energization of timer T2, are restored to their condition prior to operation of SW2. Simultaneously, the cam means associated with SW7 opens contacts 40 and closes contacts 39 whereby signal lamp P1 is again energized, and, as stated, the circuit elements return to the status that they were following operating of switch SW1 and prior to depositing a coin in switch SW2, due to release of SW6 at the end of the 70 second period of timer T2.

Summarizing the operations of the unit during the above cycle, the following brief résumé is furnished:
(1) Operate key switch SW1:
   a. Energizes all primary circuits from 115 volt, 60 cycle, alternating current.
   b. Eneregizes red signal lamp P1 (power on).
(2) Insert coin in switch SW2:
   a. Energizes coin switch SW2.
   b. Initiates 60 second timing cycle T1 to restore all circuits if not used within predetermined period.
   c. Closes for operation circuits to all photoelectric units PE1 to PE6, inclusive.
   d. Energizes green signal lamp P2 (operating cycle ready).
   e. Energizes for operation all strobe lamp units EN1 to EN6.
(3) Interrupt first light beam $a$ and/or $b$:
   a. Locks sequences relay RE2 to insure completion of cycle.
   b. Operates first cycle on No. 1 shutter.
   c. Fires first strobe lamp L1.
   d. Locks out PE1 circuit.
   e. Initiates 70 second timing cycle T2.
(4) Interrupt second light beam $c$ and/or $d$:
   a. Operates second cycle of No. 1 shutter.
   b. Fires No. 2 strobe lamp L2.
   c. Locks out PE2 circuit.
(5) Interrupt third light beam:
   a. Operates first cycle on No. 2 shutter.
   b. Fires No. 3 strobe lamp.
   c. Locks out PE3 circuit.
(6) Interrupt fourth light beam:
   a. Operates second cycle on No. 2 shutter.
   b. Fires No. 4 strobe lamp.
   c. Locks out PE4 circuit.
(7) Interrupt fifth light beam:
   a. Operates first cycle on No. 3 shutter.
   b. Fires No. 5 strobe lamp.
   c. Locks out PE5 circuit.
(8) Interrupt sixth light beam:
   a. Operates second cycle on No. 3 shutter.
   b. Fires No. 6 strobe lamp.
   c. Locks out PE6 circuit.
(9) Automatic actions at end of 10 second duration of timer T2:
   a. De-energize green signal lamp P2 and energize amber signal lamp P3 (operating cycle complete).
   b. Actuate developing solenoid CR for film DF.
   c Advance film wiper to spread developing chemical (this is conventional and not shown).
   d. Initiate relays for one minute film process.
   e. Cut off film at end of one minute cycle and eject developed print.
   f. De-energize amber signal lamp P3 and energize red signal lamp P1 (all circuits restored).
   g. Energize short audio tone signal Sig. 1 to indicate finished print ready.

Heretofore, operation of the unit U has been illustrated in connection with analyzing a bowler's motion, but, as previously explained, the principles of this invention are applicable in connection with analyzing many other motions. For example, in analyzing a golfer's swing, perhaps only three or four pictures need be taken and, of course, the PE and EN units would have to be arranged differently so that they would encompass various portions of the swinging arc of the golfer. Also, the camera shutter and lens units would have to be positioned to cooperate to an optimum extent with the flash equipment whereby the particular portions of the golfer's swing would be exposed on the film. In the event the unit was used for time and motion studies, other repositioning or adjustment of the elements would have to be made but, regardless of the particular motions being analyzed, the essential principles of this invention as described with reference to bowling would be applicable.

It should be noted that there are several automatic features included in the present embodiment. For example, once a coin of a predetermined denomination is inserted or deposited in the coin switch SW2, then the circuits are energized for permitting operation by the movement of the motion to be analyzed, but if this movement does not commence within sixty seconds following deposit of the coin, then the timer means T1 automatically restores the circuits to a condition whereby they cannot be operated without adidtional money. Also, once the first light means in the path of movement of the motion to be analyzed is interrupted, then automatic means is provided whereby the remaining light beams must be interrupted within a predetermined time or else the associated circuits will not function during the particular cycle.

Still further, once a light beam is interrupted to commence a cycle, automatic means is provided whereby interruption of that light beam a second time during the particular cycle will have no effect whatsoever on the remaining circuits. Finally, once the first light beam is interrupted by the motion to be analyzed, then automatic means is provided within a predetermined time thereafter to actuate the film advance and development means whether or not the remaining light beams traversing the normal path of movement have been interrupted within this predetermined period of time.

It should be mentioned that all photoelectric units PE and strobe lamp units EN are identical and may be arranged to plug into a control chassis on a single multiwire cable. Also, the camera parts preferably should be a completely integrated unit and adapted to plug into the control chassis on a single multiwire cable. The signal lamp and other accessories, as well as the coin switch and other switches, will preferably constitute sub-assemblies which will plug into the control chassis. All other electric circuits, including timing controls and power supplies, will preferably be assembled into a single control chassis and as to the six mirrors, M1 to M6, they will preferably be positioned on a strip extending longitudinally so that each mirror is in juxtaposition with the proper PE unit.

From the foregoing it will be seen that this invention is one well adapted to attain all the ends and objects hereinabove set forth, together with other advantages which are obvious and which are inherent to the structure. It will be understood that certain features and subcombinations are of utility and may be employed with reference to other features and subcombinations, this being contemplated by and within the scope of the appended claims.

As many embodiments may be made of the invention without departing from the essence thereof, it is clear that all the descriptive phraseology and terminology herein set forth and all matter shown in the drawings is to be interpreted as illustrative and not in a limiting sense. For example, instead of the various relays illustrated in the drawings, particularly FIGURES 3 and 3a, it is believed within the purview of this invention to substitute therefor an automatic selector switch arrangement. Also, the EN and PE units represented in FIGURES 6 and 7 could easily be varied or modified by those skilled in the art and the rather schematic showing in FIGURE 5 of the camera structure undoubtedly could be redesigned in some respects to improve the efficiency thereof. Instead of providing for considerable travel between the roller 153 and solenoid CS, the cut solenoid could be positioned immediately adjacent roller 153 and the developed picture area shown between CS and FS would be rearranged but, of course, even such redesigning would be unnecessary if the film DF were of the type having alternate blank and sensitive portions.

Also, since flash tubes, as distinguished from flash bulbs, may be reactuated or reused to a considerable extent, each unit EN could be rearranged to be associated with more than one interruption. In other words, unit EN1 could be arranged to operate not only upon interruption of beam *a* and/or *b*, but also upon interruption of beam *c* and/or *d*, and of course, each light sensitive means or photocell could, although it is not preferred, be similarly arranged for use with more than one interruption of beam *a* and/or *b*. Further, the system and apparatus could be arranged so that each shutter would be tripped or actuated three or more times instead of being designed or arranged for two trippings of each shutter as heretofore described in detail.

In the claims, reference to a beam is meant to include the light represented by *a* and *b* or *c* and *d*, etc., or, in other words, the two slightly spaced apart beams *a* and *b* are referred to as one beam in the claims.

What is claimed is:

1. In motion analyzing apparatus for analyzing the successive movements of an object during a predetermined time interval, the combination with an electrical circuit having at least two light sources for projecting spaced beams of light across the path of movement and arranged to be interrupted by the movement, light sensitive means in the circuit for each beam and being responsive thereto along with photoflash means associated with each light source and light sensitive means for projecting the flash of light across the path of movement at the area of interruption of each beam substantially simultaneously with the interruption of the light beam, of a camera having a row of lens and shutter units for taking successive pictures, a common body for mounting said lens and shutter units at divergent angles facing the path of movement to traverse separate fields of movement of the object across the path, film guide means arranged in convergent parallel relation behind said lens and shutter units for reception of a length of film at the focal planes of said lens and shutter units, said camera having means for advancing a length of film into a stationary position on said film guide means for a time interval sufficient to provide for a number of different exposures on successive portions of said film, said lens shutter units being disposed in relation to the path of movement to selectively expose successive portions of said film corresponding to the interruption of each respective light sensitive means, and means associated with the electrical circuit for tripping said shutter units in succession and operating the photoflash means substantially simultaneously upon each interruption whereby the film is exposed to successive movements of the object upon successive interruptions of the light beams.

2. In motion analyzing apparatus as defined in claim 1 wherein there is provided a coin controlled switch in the circuit for preventing the operation of the shutter units until a coin of a predetermined denomination is deposited to operate the switch.

3. In motion analyzing apparatus as defined in claim 1 including automatic means in the circuit operable to prevent the shutter units from operating during a single cycle upon more than one interruption of one of the light beams.

4. In motion analyzing apparatus as defined in claim 1 including means for developing and releasing the developed film within a predetermined period following interruption of one of the beams, said last named means being operable upon energization of a plurality of relays connected in the circuit.

5. In motion analyzing apparatus as defined in claim 2 wherein there is provided in the circuit automatic timer means operable to insure that the second light beam must be interrupted within a predetermined period of time following interruption of one of the beams.

6. In motion analyzing apparatus as defined in claim 2 wherein there is provided in the circuit timer means operable to permit operation of the shutter units only within a predetermined period following operation of the coin controlled switch.

7. In motion analyzing apparatus as defined in claim 4 including timer means in the circuit operable to permit operation of said shutter units only within a predetermined period following interruption of the first beam.

8. In motion analyzing apparatus as defined in claim 1 including automatic means for developing and releasing the developed film operable upon energization of a plurality of relays connected in the circuit, a coin controlled switch included in the circuit for preventing the operation of the shutter units until a coin of a predetermined denomination is deposited to operate the switch, and first timer means permitting operation of the shutter units within a predetermined period following operation of the switch.

9. In motion analyzing apparatus as defined in claim 8 wherein there is provided in the circuit additional timer means operable upon interruption of one of the beams for insuring that all of said beams must be interrupted within a predetermined period following interruption of the one beam.

10. In motion analyzing apparatus as defined in claim 9 wherein the additional timer means includes means to actuate the automatic means within a predetermined period of time following operation of the additional timer means.

11. In motion analyzing apparatus for analyzing and recording the movement of an object, the combination with an electrical circuit having a plurality of light sources for projecting a plurality of pairs of spaced beams of light across the path of movement and arranged to be interrupted by the movement and a light sensitive unit connected in the circuit for each source and being energized by the interruption of each light source together with a photoflash unit associated with each light source and each light sensitive unit for projecting light across the path at the area of interruption of each beam substantially simultaneously with the interruption of the beam to thereby illuminate the object, of a camera for recording successive pictures of the object moving across the path of movement having means for advancing a single length of film into a stationary position for a time interval sufficient to provide for a number of different exposures of successive portions of said film, a shutter for each successive portion of said film to be exposed, each shutter including means for selective tripping thereof whereupon said shutters are operative to provide in succession for a plurality of different exposures on each successive film portion, the successive film portions being positioned to record the object upon successive interruptions of each corresponding pair of light beams with each pair of light beams being spaced a distance such that successive operations of the corresponding shutter effect successive exposures of separate areas of the corresponding film portion, and means in the circuit for actuating said tripping means for each shutter twice upon successive interruptions of the corresponding pair of light beams and simultaneously operating the photoflash unit associated with each beam of the pair upon interruption of each beam.

12. In motion analyzing apparatus as defined in claim 11 wherein there is provided in the circuit a coin controlled switch operable to prevent the operation of the shutter and a photoflash unit until a coin of a predetermined denomination is deposited to operate the switch.

13. In motion analyzing apparatus as defined in claim 12 including time controlled means in the circuit operable to permit the shutter to be tripped and photoflash unit operation within a predetermined period of time following operation of the coin switch.

14. In motion analyzing apparatus as defined in claim 11 including automatic timer means connected in said circuit for insuring that all light beams must be interrupted within a predetermined period of time following interruption of one of the beams and operation of its associated photoflash unit.

15. In motion analyzing apparatus as defined in claim 11 including automatic means for developinf and releasing the developed film and timer controlled means for operating said last named means within a predetermined period following tripping of the shutter.

16. In motion analyzing apparatus as defined in claim 11 including switch means and first timing means, means for actuating said switch means whereby operational current is supplied to operate said first timer means, and means associated with said first timer means for permitting at least one tripping of the shutter within a first predetermined period of time following operation of the switch.

17. In motion analyzing apparatus as defined in claim 16 including second timing means, automatic means for developing and releasing the developed film, said second timing means having associated therewith means for permitting the shutter to be tripped during a second predetermined period of time and for operating said automatic means at the end of the second predetermined period of time.

18. In motion analyzing apparatus for analyzing the successive movements of an object over a predetermined time interval, an electrical circuit comprising a plurality of pairs of light sources for projecting spaced beams of light across the path of movement, a light sensitive unit responsive to each light source, a camera having a lens and shutter for each pair of light sources and respective light sensitive units together with means for positioning a length of film into a stationary position for exposure during the predetermined time interval, and means in said circuit for selectively tripping each shutter twice in response to the successive interruption of a corresponding pair of light beams, and the spacing between pairs of light sources in relation to each lens and shutter being such that two separate images of two successive phases of movement of the object are formed on two successive areas of a length of the film in response to two successive trippings of the shutter for that length of film.

19. In motion analyzing apparatus for analyzing the movement of an object moving across an illuminated path in which sensing means are disposed to be energized at successive intervals in response to the movement of the object across the illuminated path, the combination of a camera comprising a film guide portion, advancing means to advance a length of film into a stationary position on said film guide portion in the camera for a time interval sufficient to provide for a number of different exposures on successive portions of said film, a row of lens and shutters being disposed at divergent angles in facing relation to the path of movement to selectively expose successive portions of the film to separate fields of movement of the object along the illuminated path, and means responsive to each energization of said sensing means for tripping each of said shutters in succession to expose successive portions of the film to the movement of the object substantially simultaneously upon energization of said sensing means at successive intervals.

20. In motion analyzing apparatus for analyzing the movement of an object moving across an illuminated path in which sensing means are disposed to be energized at successive intervals by the movement of the object across the path, the combination of a camera comprising a lens and shutter unit corresponding to each two successive energizations of said sensing means with each shutter unit being arranged to traverse a separate field of movement of the object through the path of movement, means in said camera for positioning a length of film into stationary position for exposure during a predetermined time interval, and means in said circuit for selectively tripping each shutter twice in response to two successive energizations of the sensing means to provide for two separate images of two successive phases of movement of the object on two successive portions of a length of the film in response to two successive trippings of the shutter for that length of film.

21. In motion analyzing apparatus for analyzing an object moving through an illuminated path of movement in which light sensitive units are stationed along the path of movement to be energized in response to the interruption of light by the movement of the object through the path, the combination therewith of a camera for recording successive pictures of the object as it moves through the illuminated path, said camera comprising a series of lens and shutter units disposed at divergent angles in relation to one another with each lens and shutter unit arranged to traverse a separate field of movement of the object as it moves along the illuminated path, a single common length of film for said lens and shutter units disposed in fixed convergent relation to said units at the focal planes thereof during a predetermined time interval to provide for exposure of successive portions of the film as each successive shutter is tripped, means responsive to energization of each of said light sensitive units to trip a corresponding shutter substantially simultaneously upon energization of each of the light sensitive units to expose a portion of the film to the field of movement of the object upon energization of each light sensitive unit, means for advancing the exposed length of film for development and subsequent release upon tripping of said shutter units, and timer control means for operating said last-named means within a predetermined period following tripping of all of said shutter units.

22. In motion analyzing apparatus for analyzing the successive movements of an object along a path of movement during a predetermined time interval, the combination with an electric circuit having a plurality of light sources disposed in predetermined spaced relation for projecting spaced beams of light across a path of movement and a light sensitive unit responsive to each light source, of a camera including a body and a row of lens and shutter units arranged at divergent angles on the body to traverse separate field of movement of the object along the path corresponding to each of the fields of movement traversed by each respective light source, a film guide portion disposed in convergent parallel relation behind said lens and shutter units for reception of a length of film at the focal planes of said lens and shutter units, and a single length of film for said camera disposed in fixed position on said film guide portion during the predetermined time interval to provide for exposure of successive portions of said film as each successive shutter is tripped, and means in said camera for selectively tripping each shutter in succession in response to interruption by the object of each spaced beam.

References Cited in the file of this patent

UNITED STATES PATENTS

| 279,878 | Muybridge | June 19, 1883 |
| 1,559,400 | Bagley et al. | Oct. 27, 1925 |
| 1,816,290 | Klimis | July 28, 1931 |
| 2,086,087 | Melton | July 6, 1937 |
| 2,139,703 | Taylor | Dec. 13, 1938 |
| 2,194,808 | Pooley | Mar. 26, 1940 |
| 2,269,862 | Rose | Jan. 13, 1942 |
| 2,382,981 | Edgerton | Aug. 21, 1945 |
| 2,408,764 | Edgerton | Oct. 8, 1946 |
| 2,541,016 | Allen | Feb. 13, 1951 |
| 2,571,974 | Walker | Oct. 16, 1951 |
| 2,586,772 | Ashby et al. | Feb. 26, 1952 |
| 2,650,095 | MacLagan et al. | Aug. 25, 1953 |
| 2,825,569 | Alvarez | Mar. 4, 1958 |

OTHER REFERENCES

High Speed Photography by Geo. A. Jones, published 1952 by Chapman and Hall, pages cited 6–9, 51, 52, 91, 101–106.

The Photographic Study of Rapid Events by W. D. Chesterman, published 1951 by Clarendon Press, pages 15, 16, and 52, 53 (5.1) cited.

Flash, "Seeing the Unseen by High Speed Photography" by Edgerton and Killian, 1939, pages 164, 194 cited.